Figure 4:
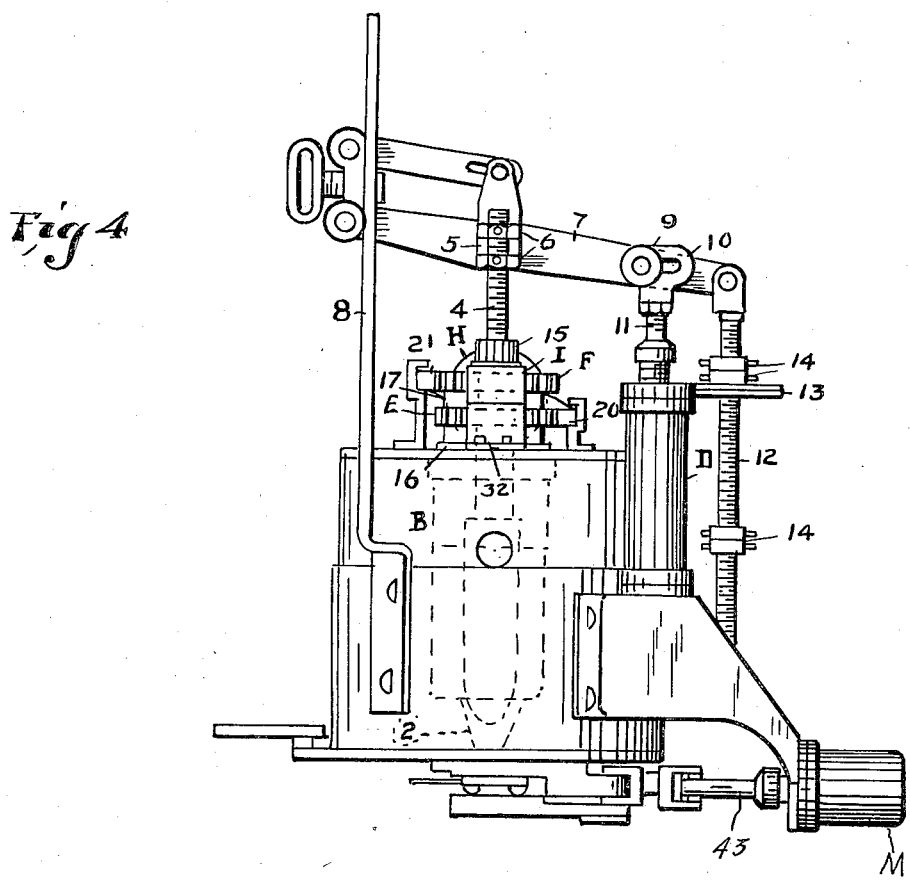

May 10, 1927.  
W. J. MILLER  
1,628,324  
PROCESS AND APPARATUS FOR FEEDING GLASS  
Filed July 22, 1921  3 Sheets-Sheet 1
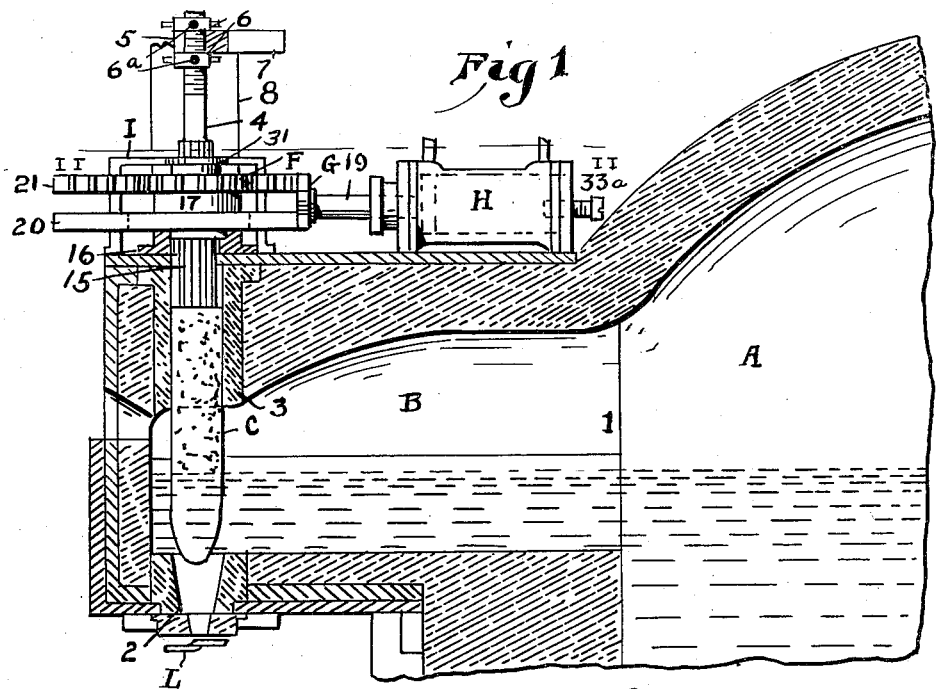
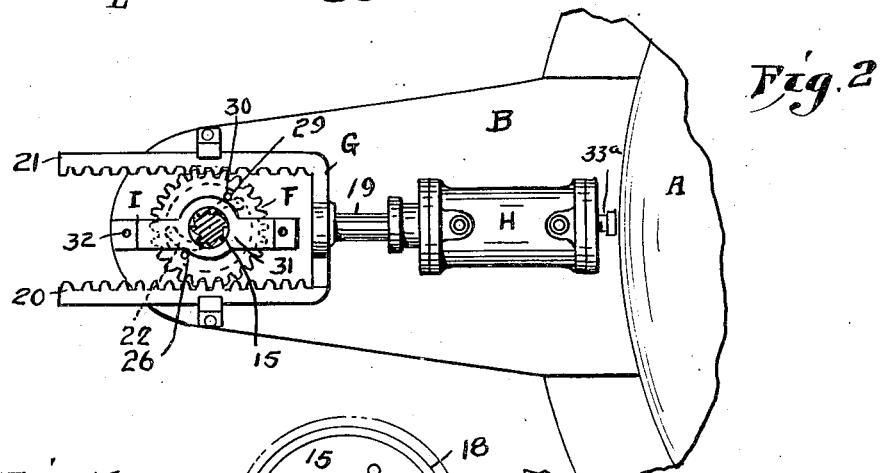
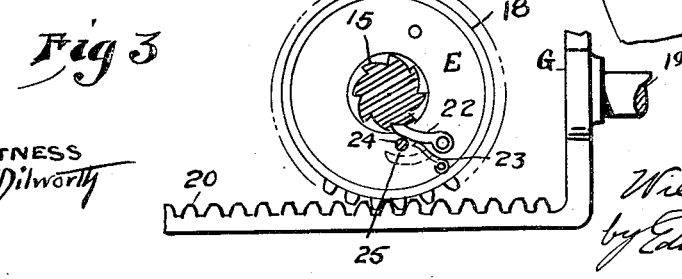

May 10, 1927.

W. J. MILLER 1,628,324

PROCESS AND APPARATUS FOR FEEDING GLASS

Filed July 22, 1921   3 Sheets-Sheet 2

WITNESS
R.F. Dilworth

INVENTOR
William J. Miller.
by Edward A. Lawrence.
his attorney.

May 10, 1927.
W. J. MILLER
PROCESS AND APPARATUS FOR FEEDING GLASS
Filed July 22, 1921
1,628,324
3 Sheets-Sheet 3
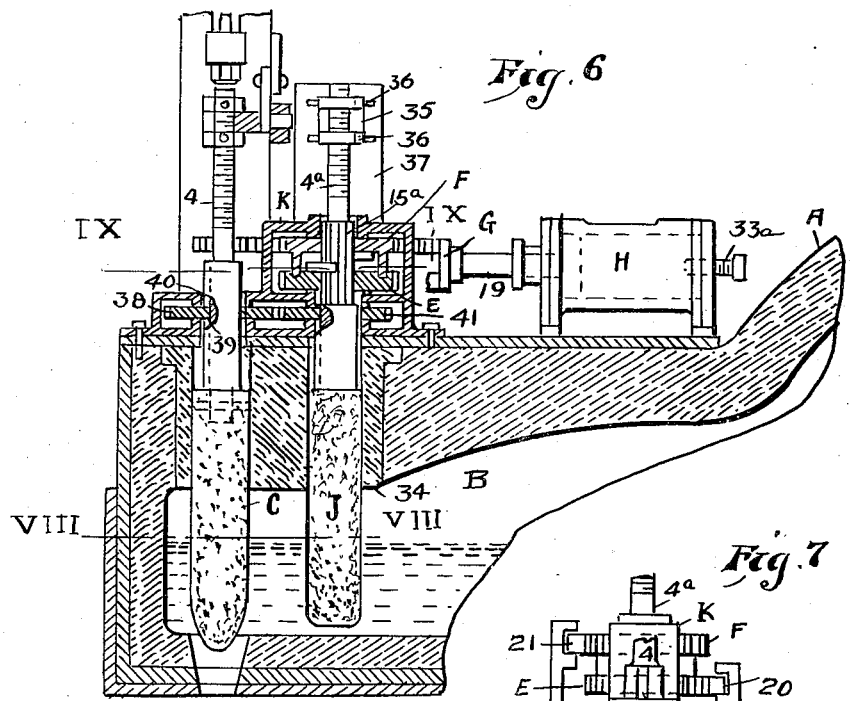
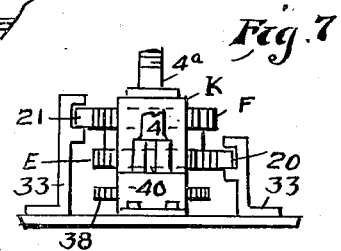
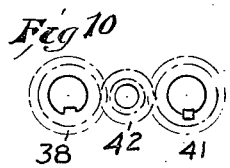
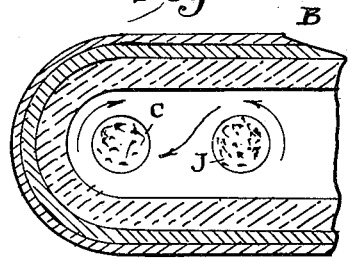
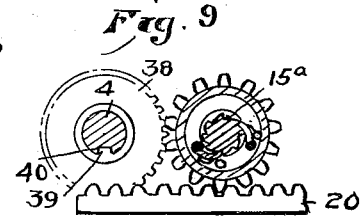
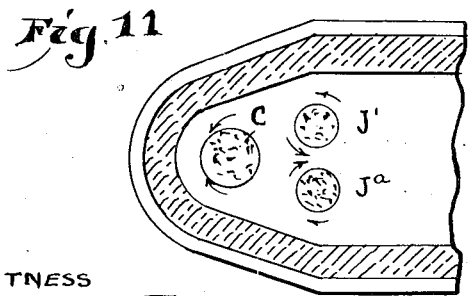
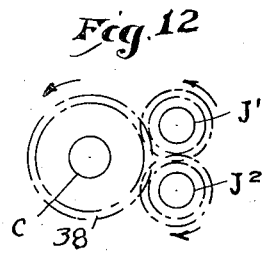
WITNESS
P. F. Dilworth
INVENTOR
William J. Miller.
by Edward A. Lawrence,
his attorney.

Patented May 10, 1927.

1,628,324

UNITED STATES PATENT OFFICE.

WILLIAM J. MILLER, OF SWISSVALE BOROUGH, PENNSYLVANIA, ASSIGNOR TO HARTFORD-EMPIRE COMPANY, OF HARTFORD, CONNECTICUT, A CORPORATION OF DELAWARE.

PROCESS AND APPARATUS FOR FEEDING GLASS.

Application filed July 22, 1921. Serial No. 486,712.

My invention consists in a new and improved process and apparatus for feeding glass.

In the automatic feeding of glass, it is very important that the temperature of the portion of the glass as discharged be uniform throughout its entire cross section and length, and also that the temperature of the succession of gobs or portions discharged be uniform.

In automatic feeders the glass is usually discharged from a shallow receptacle or boot connected with the tank, and to which the glass is supplied from the tank by a constant level opening or by some other means. The glass in the boot tends to chill next to the walls and floor of the boot, leaving a zone of hotter glass along the top center of the boot. The result is a body of glass of irregular temperature and viscosity which causes cordy or imperfect ware.

The discharge orifice of the feeder is usually in the floor of the boot adjacent to its nose, and therefore the glass at the front and sides of the discharge orifice is colder than that at the rear, tending to devitrify and rendering the temperature of the glass as it is discharged uneven throughout its cross section.

Variations in temperature, of course, result in varying viscosity; and, insomuch as viscosity is an important factor in glass feeding, especially in the formation of suspended gobs, unless the temperature throughout the cross section and length of the gob is uniform, the gob will be distorted and improperly shaped; and if the temperatures of the gobs vary, no uniformity of size and shape can be maintained in a succession of gobs.

Attempts have been made to rectify these conditions by imposing baffles or dividing blocks in the path of the glass entering the feeder boot for the purpose of diverting the hot glass toward the walls of the boot, but this has not produced satisfactory results.

The object which I have in view is to insure a uniform temperature throughout the glass in the boot, so that not only will the temperature throughout the cross section and length of a gob or discharged portion be uniform, but also the temperature of the succession of gobs or portions will be maintained uniform.

I accomplish these objects by a stirring or agitation of the glass in the boot which is carried on contemporaneously with the discharge of gobs or portions, thereby breaking up and thoroughly intermingling the zones and strata of different temperatures into a mass of uniform temperature and, consequently, uniform viscosity.

As a convenient means for causing the desired stirring or agitation of the glass, I may use a rotary stirring tool or tools formed of refractory material and extending into the molten glass contained in the boot. In the case of a feeder provided with a bottom discharge orifice and with a reciprocating plunger to control the discharge of glass through the orifice, I may accomplish the agitation or stirring of the glass by imparting a rotary motion to the reciprocating plunger. Or I may use one or more stirring tools distinct from the plunger which latter may or may not be rotated.

In the case of stream feeders wherein a valve is provided for closing the discharge orifice to shut down the feed, said valve may be rotated, when elevated, to perform the functions of a stirrer.

Figure 5:
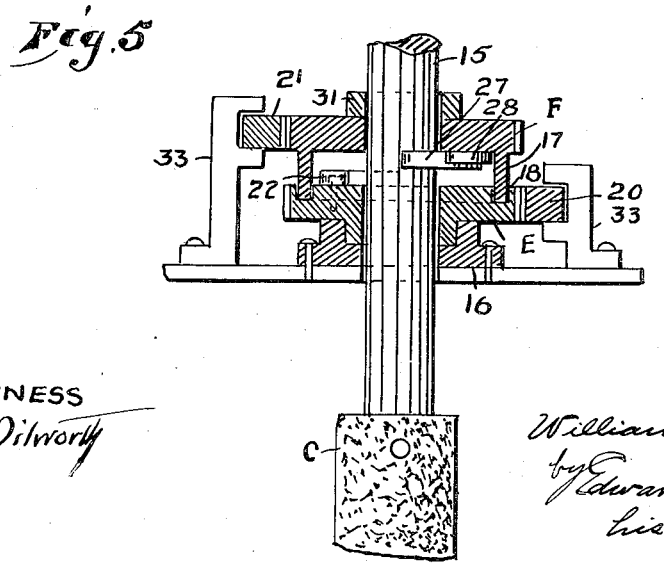

In the accompanying drawings, which are merely intended to illustrate the principles of my invention without limiting the scope of the latter to the construction shown, and wherein I show my invention in connection with a feeder provided with an orifice in the floor of the boot and a vertically disposed plunger reciprocating in relation to said orifice to control the discharge of glass, Fig. 1 is a vertical section of the feeder mechanism; Fig. 2 is a plan view partially in section along the line II—II in Fig. 1; Fig. 3 is an enlarged detail showing part of the rotator yoke and its operative connection to the plunger; Fig. 4 is a front elevation of the feeder; Fig. 5 is a detail in section showing the plunger revolving gears and the plunger stem; Fig. 6 is a view similar to Fig. 1 showing a second stirring member or tool rotated in opposite direction to the plunger; Fig. 7 is a front view of the housing shown in Fig. 6; Fig. 8 is a horizontal section taken along the line VIII—VIII in Fig. 6; Fig. 9 is a section taken along the line IX—IX in Fig. 6 showing the operative connection between the plunger and the stirrer; Fig. 10 is a diagrammatic view illustrating means for rotating the plunger and the stirrer in the same direction; Fig. 11 is a section similar to Fig. 8 showing the use of two stirrers in addition to the plunger, and Fig. 12 is a view similar to Fig. 9 showing the assembling of the two stirrers.

The following is a detailed description of the drawings, reference being first had to Figs. 1, 2, 3, 4, and 5.

A represents the glass tank from which extends the relatively shallow receptacle or boot B. I have shown the boot supplied with glass from the tank through the constant level opening or passage 1; but any other convenient means for supplying glass from the tank to the boot may be substituted. The boot B is provided with a bottom discharge orifice 2 near its nose or outer end.

C is a vertically disposed plunger which is alined with and reciprocates in relation to the orifice 2 to control the flow of glass through the latter. The body of the plunger is formed of refractory material and the same is guided in its movement by means of the slide bearing formed by the bushing 3 depending through an aperture in the roof of the boot.

The plunger is suspended by a metal stem 4 whose lower portion is of enlarged diameter and whose threaded upper portion extends through a bifurcated head 5 in which it is adjustably secured by upper and lower nuts 6, thus providing for the regulation of the position of the plunger. The stem 4 fits loosely enough in the head 5 to permit free rotation of the plunger and the nuts 6 are not screwed tight enough against the head to bind, said nuts being preferably locked in position by the small set screws 6ª. The head 5 is pivotally mounted on the walking beam 7, to swing on a horizontal axis.

One end of the walking beam 7 is adjustably fulcrumed on a post 8 extending up from the boot B, while near its other end a bolt 9 connects said walking beam with the horizontally slotted head 10 of the piston rod 11 connected to the piston in the fluid pressure cylinder D.

12 is a threaded bolt pivoted to the adjacent end of the walking beam and depending through a hole in a plate 13 extending from the head of cylinder D, and 14 represents upper and lower stop nuts by means of which the uppermost and lowermost positions of the plunger may be regulated.

The lower enlarged portion of the plunger stem 4 is provided with a circumferential series of teeth 15, said teeth being pitched in the direction in which the plunger is to be rotated, shown as clockwise in Fig. 3.

16 is a collar bolted to the top of the boot B and whose bore loosely fits the stem 4. The upper face of said collar is circularly recessed to receive the hub of the gear wheel E, also loosely fitting said stem. F is a second gear wheel of the same diameter, also loosely fitting the stem 4 and provided on its lower face with a depending annular flange 17 which seats in annular groove 18 in the upper face of the gear E, thus rotatably supporting the gear F on the gear E.

G is a yoke member whose base is secured to the piston rod 19 of the piston working in the horizontally disposed, fluid pressure cylinder H mounted on top of the boot.

The two parallel legs 20 and 21 of said yoke extend on either side of the gears E and F, the leg 20 being on the same level as the lower gear E while the leg 21 is on the level of the upper gear F. The inner faces of said legs are provided with teeth which mesh with the teeth of said gears, so that as said yoke is reciprocated by means of fluid pressure admitted to the ends of the cylinder H, the gears are rotated first in one direction and then in the other; the two gears always moving in opposite directions to each other.

The gear E is provided on its upper surface with a pawl 22 held in engagement with the teeth 15 of the plunger stem by a leaf spring 23, so that when the lower gear is rotated in a clockwise direction by the outward movement of the yoke G, the plunger will also be rotated but when the gear is rotated counter-clockwise by the retreat of the yoke, the pawl will trail idly over the teeth 15 without reversing the rotary movement of the plunger. If desired the pawl may be held retracted by means of a pin 24 inserted in a hole 25 in the gear in front of the pawl, thereby disconnecting the gear from the plunger. By inserting the pin in the rear of the pawl, the same will be locked in engagement with the teeth 15, as shown in Fig. 3. The upper gear F may be provided with a suitable aperture 26 to permit the pin 24 to be inserted down into the hole 25 in the gear E.

On its under face the gear F is also provided with a pawl 27 held in engagement with the teeth 15 by a leaf spring 28, so that when the gear F is rotated clockwise by the retreat of the yoke G, the plunger will be rotated in the same direction while the counterclockwise rotation of the gear F will not impart similar rotation to the plunger.

A headed pin 29 may be inserted down through the hole 30 in the gear F to hold the pawl 27 retracted and disconnect the gear F from the plunger or to lock the pawl in engagement with the teeth 15.

Thus the reciprocation of the yoke G will result in substantially continuous rotation in one direction of the plunger.

If desired the pawl of one of the gears may be pinned back in its inoperative position, whereby the plunger will be rotated intermittently.

If the pawl of one of the gears be locked in its retracted position while the pawl of the other gear is locked into contact with the teeth 15, the plunger will be rotated back and forth or in opposite directions.

To prevent the gears E and F from being moved upwardly with the stem 4, I provide an arched housing I having at its center a collar 31 which encircles the stem 4 above the gear F, and whose legs are bolted to the top of the boot B, as at 32.

33 represent recessed guides extending up from the top of the boot and in which the legs 20 and 21 of the yoke slide to maintain them in proper alinement.

The cylinder H is provided with any suitable character of valve control for the admission of fluid pressure alternately to its opposite ends to produce the desired reciprocation of the yoke. The speed of plunger rotation is dependent upon the depth of glass in the boot and its fluidity, as a shallow body of relatively hot glass requires less stirring than a deeper and colder body of glass. The rear end of the cylinder is preferably provided with a screw bolt 33ª extending through a threaded hole in the rear end of the cylinder, whereby the inward movement of the piston and consequently the cycle of the yoke G may be adjusted as desired.

It is preferable, however, to insure one or more complete rotations of the plunger for each reciprocal cycle, so that the plunger will always be presented at its lowermost point in exactly the same position; thus avoiding variations of discharge due to irregularities in the plunger. It is also preferable to have the plunger always assume the same position in its uppermost position.

It is evident that the rotation of the plunger will thoroughly stir up and intermingle the glass in the boot, so that the glass passing into the discharge orifice from all sides will be of uniform temperature, and that this rotary movement, assisted by the vertical reciprocation of the plunger will completely obliterate all unevenness of temperature of the glass in the boot.

In Figs. 6, 7, 8 and 9, I show the use of a second stirring or agitating tool in addition to the plunger.

Thus J is a tool of refractory material suspended through the top bushing 34 by means of a metal stem 4ª whose lower portion is of enlarged diameter and provided with a circumferentially disposed series of teeth 15ª pitched in the desired direction of rotation of the tool J. The upper end of the stem 4ª is inserted in a bifurcated head 35 and nuts 36 screwed on said stem above and below said head provide means for regulating the extent to which the tool J is immersed in the glass in the boot. The head 35 is supported by a post 37 extending up from the boot.

The plunger C and the tool J extend up through a housing K which is bolted to the top of the boot to contain the lower and upper gears E and F which are in this case mounted on the stem on the tool J, instead of on the plunger C as in Fig. 1. The plunger C is provided with a gear 38 mounted in the housing K and having an integral key 39 which engages a longitudinal slot 40 in the plunger stem 4, so that while the plunger moves freely up and down in the bore of the gear, it rotates with the gear. The gear 38 is in mesh with a gear 41 keyed to the stem 4ª of the tool J. The teeth of the legs 20 and 21 of the yoke G are in mesh with the gears E and F, respectively.

It is evident that the tool J will be rotated in one direction, say counterclockwise, while the plunger will be rotated in the other direction. If desired, the gear 38 may be omitted, and thus the plunger will not be rotated.

In Fig. 10 I show an idler gear 42 interposed between the gears 38 and 41, thus causing the plunger to rotate in the same direction as the tool.

In Fig. 6 I show the tool J well forward in the boot, but it will be understood that the same may be located nearer the tank or additional rotary tools may be provided, if found necessary, to keep the entire contents of the boot well stirred and intermingled.

In Figs. 11 and 12 I illustrated the use of a pair of rotary stirring tools J' and J² placed side by side in the rear of the plunger C, one of said tools being rotated in one direction by the leg 20 of the yoke G while the other tool is rotated in the opposite direction by the leg 21. The plunger may, if found necessary, be geared to one of the tools to receive rotation therefrom.

It will be understood that the number of rotating tools required depends upon the quantity and temperature of the glass passing from the tank into the boot. Where the glass is being discharged in large units or portions, a relatively large volume of glass will be travelling into the boot and sufficient stirring means should be provided to insure a uniform temperature condition in the glass.

I have shown the stirring members in a vertical position, but it is evident that the same may be inclined to the vertical, or even be horizontally disposed, if desired, without departing from the spirit of my invention.

Suitable shearing means are provided to detach the masses of glass depending from the outlet. Numerous types of shears or cutting means are well known in the art, and any of the same may be employed in connection with the feeder. For the sake of illustration I have indicated fluid-pressure operated shears, M indicating the fluid pressure cylinder to whose piston rod 43 the shear blades L are connected in such manner that an extension of the piston rod causes the shears to open and its retraction causes the blades to close.

Although for the sake of clearness of illustration of the principles of my invention, I have minutely described the embodiments of the same shown in the drawings, I do not limit myself thereby, but claim broadly.

1. In glass feeding mechanism, the combination of a receptacle for molten glass provided with a discharge orifice, means reciprocating within said receptacle for propelling the glass through said orifice, and a rotary stirring tool immersed in the glass within said receptacle, for the purpose described.

2. In apparatus for producing a succession of charges of molten glass, the combination of a receptacle for the molten glass provided with a submerged discharge outlet, a rigid reciprocating means working in the glass in relation to the outlet to control the discharge of glass from the outlet, means for reciprocating said implement to move it toward and away from the outlet, means for detaching the discharged masses of glass from the outlet, and means to stir the glass in the receptacle including a second implement immersed in said glass.

3. In apparatus for producing a succession of charges of molten glass, the combination of a receptacle for the molten glass provided with a submerged discharge outlet, a rigid reciprocating means working in the glass in relation to the outlet to control the discharge of glass from the outlet, means for reciprocating said implement to move it toward and away from the outlet, means for detaching the discharged masses of glass from the outlet, a second implement immersed in the glass in the receptacle, and means for rotating said second implement to stir the glass.

4. In apparatus for producing a succession of charges of molten glass, the combination of a receptacle for the molten glass provided with a submerged discharge outlet, a rigid reciprocating means working in the glass in relation to the outlet to control the discharge of glass from the outlet, means for reciprocating said implement to move it toward and away from the outlet, means for detaching the discharged masses of glass from the outlet, and means to stir the glass in the receptacle including a second implement immersed in said glass, said second implement being disposed out of alinement with said rigid reciprocating implement.

5. In apparatus for producing a succession of charges of molten glass, the combination of a receptacle for the molten glass provided with a submerged discharge outlet, a rigid reciprocating means working in the glass in relation to the outlet to control the discharge of glass from the outlet, means for reciprocating said implement to move it toward and away from the outlet, means for detaching the discharged masses of glass from the outlet, a second implement immersed in the glass in the receptacle, and means for rotating said second implement to stir the glass, said second implement being disposed out of alinement with said rigid reciprocating implement.

6. In apparatus for producing a succession of charges of molten glass, the combination of a receptacle for the molten glass provided with a submerged discharge outlet, means effective in alinement with the outlet for regulating the discharge of glass from the outlet, and a stirring implement immersed in the glass in the receptacle.

7. In apparatus for producing a succession of charges of molten glass, the combination of a receptacle for the molten glass provided with a submerged discharge outlet, means effective in alinement with the outlet for regulating the discharge of glass from the outlet, and a stirring implement immersed in the glass in the receptacle, said stirring implement being disposed out of alinement with the outlet.

8. In apparatus for producing a succession of charges of molten glass, the combination of a receptacle for the molten glass provided with a submerged discharge outlet, a rigid reciprocating implement working in the glass in relation to the outlet to control the discharge of glass from the outlet, a stirring implement immersed in the glass in said receptacle, means for reciprocating said first mentioned implement to move it toward and away from the outlet, and means for actuating said second mentioned implement to stir the glass in the receptacle.

9. In apparatus for producing a succession of charges of molten glass, the combination of a receptacle for the molten glass provided with a submerged discharge outlet, a rigid implement working in the glass in the receptacle in relation to the outlet to control the discharge of glass from the outlet, means for reciprocating said implement to move it toward and away from the outlet, a power-driven reciprocating element, and connections between said element and said implement whereby the movement of said element imparts rotary movement to said implement.

10. In apparatus for producing a succession of charges of molten glass, the combination of a receptacle for the molten glass provided with a submerged discharge outlet, a rigid implement working in the glass in the receptacle in relation to the outlet to control the discharge of glass from the outlet, means for reciprocating said implement to move it toward and away from the outlet, a power-driven reciprocating element, and connections between said element and said implement whereby the movement of said element imparts rotary movement to said implement in a constant direction.

11. In apparatus for producing a succession of charges of molten glass, the combination of a receptacle for the molten glass provided with a submerged discharge outlet, a rigid implement working in the glass in the receptacle in relation to the outlet to control the discharge of glass from the outlet, means for reciprocating said implement to move it toward and away from the outlet, a power-driven reciprocating element, and connections between said element and said implement whereby the movement of said element imparts an intermittent rotary movement to said implement.

12. In apparatus for producing a succession of charges of molten glass, the combination of a receptacle for the molten glass provided with a submerged discharge outlet, a rigid implement working in the glass in the receptacle in relation to the outlet to control the discharge of glass from the outlet, means for reciprocating said implement to move it toward and away from the outlet, a power-driven reciprocating element, and connections between said element and said implement whereby the movement of said element imparts an intermittent rotary movement to said implement in a constant direction.

13. In apparatus for producing a succession of charges of molten glass, the combination of a receptacle for the molten glass having a submerged discharge outlet, a rigid reciprocating implement working in the glass in the receptacle in relation to the outlet to control the discharge of glass from the outlet, means for reciprocating the implement to move it toward and away from the outlet, a rack, means for imparting a reciprocating movement to said rack, and meshed tooth connection between the rack and the implement whereby the reciprocation of the rack imparts rotary movement to the implement.

14. In apparatus for producing a succession of charges of molten glass, the combination of a receptacle for the molten glass having a submerged discharge outlet, a rigid reciprocating implement working in the glass in the receptacle in relation to the outlet to control the discharge of glass from the outlet, means for reciprocating the implement to move it toward and away from the outlet, a rack, means for imparting a reciprocating movement to said rack, and meshed tooth connection between the rack and the implement whereby the reciprocation of the rack imparts rotary movement to the implement in a constant direction.

15. In apparatus for producing a succession of charges of molten glass, the combination of a receptacle for the molten glass provided with a submerged discharge outlet, a rigid reciprocating implement working in the glass in relation to the outlet to control the discharge of glass from the outlet, means for reciprocating said implement to move it toward and away from the outlet, a double rack member, means for imparting a reciprocating movement to said rack, and meshed connections between both sides of said rack member and said implement whereby the reciprocating movement of said rack imparts a rotary movement to said implement.

16. In apparatus for producing a succession of charges of molten glass, the combination of a receptacle for the molten glass provided with a submerged discharge outlet, a rigid reciprocating implement working in the glass in relation to the outlet to control the discharge of glass from the outlet, means for reciprocating said implement to move it toward and away from the outlet, a double rack member, means for imparting a reciprocating movement to said rack, meshed connections between both sides of said rack member and said implement whereby the reciprocating movement of said rack imparts a rotary movement to said implement, and means whereby the rotary movement of the implement is caused to be in a constant direction.

17. In apparatus for producing a succession of charges of molten glass, the combination of a receptacle for the molten glass provided with a submerged discharge outlet, means effective in alinement with the outlet for regulating the discharge of the glass from the outlet, means for reciprocating said means to move it toward and away from the outlet, a stirring implement immersed in the glass in said receptacle, a power-reciprocated member, and connections between said member and said stirring implement whereby the reciprocation of said member imparts rotary movement to said stirring implement.

18. In apparatus for producing a succession of charges of molten glass, the combination of a receptacle for the molten glass provided with a submerged discharge outlet, means effective in alinement with the outlet for regulating the discharge of the glass from the outlet, means for reciprocating said means to move it toward and away from the outlet, a stirring implement immersed in the glass in said receptacle, a power-reciprocated member, connections between said member and said stirring implement whereby the reciprocation of said member imparts a rotary movement to said stirring implement, and means whereby the rotary movement of the implement is caused to be in a constant direction.

19. In apparatus for producing a succession of charges of molten glass, the combination of a receptacle for the molten glass provided with a submerged discharge outlet, a rigid implement working in the glass in relation to the outlet and arranged for two characteristic movements, a reciprocating movement and a rotary movement, means for reciprocating said implement to move it toward and away from the outlet, means for rotating said implement, and means for varying one of the characteristic movements of the implement without changing its other characteristic movement.

20. In apparatus for producing a succession of charges of molten glass, the combination of a receptacle for the molten glass provided with a submerged discharge outlet, a rigid implement working in the glass in relation to the outlet, means for reciprocating said implement to move it toward and away from the outlet, means for rotating said implement, and means operable while the driving connections subsist for varying the rotary movement of the implement without changing its reciprocating movement.

21. In apparatus for producing a succession of charges of molten glass, the combination of a receptacle for the molten glass provided with a submerged discharge outlet, a rigid implement working in the glass in relation to the outlet, means for reciprocating said implement to move it toward and away from the outlet, means for rotating said implement, and means operable while the driving connections subsist for varying the reciprocating movement of the implement without changing its rotary movement.

22. In apparatus for producing a succession of charges of molten glass, the combination of a receptacle for the molten glass provided with a submerged discharge outlet, means effective in alinement with the outlet to regulate the discharge of glass from the outlet, a stirring implement immersed in the glass in said receptacle, means for operating said stirring implement, and means for varying the operation of said stirring implement without changing the operation of said regulating means.

23. In apparatus for producing a succession of charges of molten glass, the combination of a receptacle for the molten glass provided with a submerged discharge outlet, a rigid implement working in the glass in relation to the outlet to control the discharge of glass from the outlet, means for reciprocating said rigid implement to move it toward or away from the outlet, a stirring implement immersed in the glass in said receptacle, means for actuating said stirring implement, and means for varying the actuations of said stirring implement without changing the movement of said rigid implement.

24. In apparatus for producing a succession of charges of molten glass, the combination of a receptacle for the molten glass provided with a submerged discharge outlet, a rigid implement working in the glass in relation to the outlet to control the discharge of glass from the outlet, means for reciprocating said rigid implement to move it toward or away from the outlet, a stirring implement imersed in the glass in said receptacle, means for rotating said stirring implement, and means for varying the movements of one of said implements without varying the movements of the other of said implements.

25. In apparatus for producing a succession of charges of molten glass, the combination of a receptacle for the molten glass provided with a submerged discharge outlet, a rigid implement working in the glass in relation to the outlet to control the discharge of glass from the outlet, means for reciprocating said implement to move it toward and away from the outlet, and means for rotating said implement, said rotating means intermitting the rotary movement of the implement while the latter is in its position nearest to the outlet.

26. In apparatus for producing a succession of charges of molten glass, the combination of a receptacle for the molten glass provided with a submerged discharge outlet, a rigid implement working in the glass in relation to the outlet to control the discharge of glass from the outlet, means for reciprocating said implement to move it toward and away from the outlet, and means for rotating said implement, said rotary movement being confined to the periods during which the implement is in motion in its path of reciprocation.

27. In apparatus for producing a succession of mold charges of molten glass, the combination with a receptacle for the molten glass having a submerged discharge outlet, of a rigid implement working in the glass in the receptacle to control the discharge of glass from the outlet, means for reciprocating the implement to move it toward and away from the outlet, and connections for rotating the implement simultaneously with its longitudinal movement, said connections being such that the rotation ceases as the implement approaches the outlet.

28. In apparatus for producing a succession of mold charges of molten glass, the combination with a receptacle for the molten glass having a submerged discharge outlet, of a rigid implement working in the glass in the receptacle to control the discharge of glass from the outlet, fluid-pressure cylinder and piston means for rotating said implement, and means for adjusting the travel of the piston in the cylinder.

29. In apparatus for producing a succession of mold charges of molten glass, the combination with a receptacle for the molten glass having a submerged discharge outlet, of a rigid implement working in the glass in the receptacle to control the discharge of glass from the outlet, fluid-pressure cylinder and piston means for rotating said implement, and means for varying the path of movement of the piston in the cylinder.

30. In apparatus for producing a succession of mold charges of molten glass, the combination with a receptacle for the molten glass having a submerged discharge outlet, of a rigid implement working in the glass in the receptacle to control the discharge of glass from the outlet, fluid-pressure cylinder and piston means for rotating said implement, and means for varying the length of the stroke of said piston.

Signed at Pittsburgh, Pa., this 3rd day of June, 1921.

WILLIAM J. MILLER.